United States Patent
Li et al.

(10) Patent No.: US 9,332,266 B2
(45) Date of Patent: May 3, 2016

(54) METHOD FOR PREDICTION IN IMAGE ENCODING AND IMAGE ENCODING APPARATUS APPLYING THE SAME

(75) Inventors: Gwo Long Li, Kaohsiung (TW); Chih Hsu Yen, Hsinchu County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 848 days.

(21) Appl. No.: 13/594,377

(22) Filed: Aug. 24, 2012

(65) Prior Publication Data
US 2014/0056355 A1 Feb. 27, 2014

(51) Int. Cl.
*H04N 7/32* (2006.01)
*H04N 19/156* (2014.01)
*H04N 19/52* (2014.01)
(Continued)

(52) U.S. Cl.
CPC ........... *H04N 19/156* (2014.11); *H04N 19/127* (2014.11); *H04N 19/176* (2014.11); *H04N 19/52* (2014.11); *H04N 19/107* (2014.11); *H04N 19/147* (2014.11); *H04N 19/433* (2014.11);
(Continued)

(58) Field of Classification Search
CPC ... H04N 19/52; H04N 19/176; H04N 19/147; H04N 19/61; H04N 19/96; H04N 19/107; H04N 19/463; H04N 19/127; H04N 19/156; H04N 19/433
USPC ..................................................... 375/240.16
See application file for complete search history.

(56) References Cited

U.S. PATENT DOCUMENTS

| 6,148,109 | A  | 11/2000 | Boon et al. |
| 7,953,151 | B2 | 5/2011  | Shimizu et al. |

(Continued)

FOREIGN PATENT DOCUMENTS

| TW | I315639   | 10/2009 |
| TW | 201136325 | 10/2011 |

(Continued)

OTHER PUBLICATIONS

Li et al. "RD Optimized Bandwidth Efficient Motion Estimation and Its Hardware Design with On-Demand Data Access". IEEE Transactions on Circuits and Systems for Video Technology, vol. 20, No. 11. Nov. 2010, pp. 1565-1576.*

(Continued)

*Primary Examiner* — Christopher S Kelley
*Assistant Examiner* — Zhihan Zhou
(74) *Attorney, Agent, or Firm* — WPAT, P.C., Intellectual Property Attorneys; Anthony King

(57) ABSTRACT

A method for prediction in image encoding and an image encoding apparatus applying the same are disclosed. The method includes steps of receiving a plurality of candidates with respect to a current prediction target of an image; calculating a distortion-based cost of a first candidate in the plurality of candidates; and for each of the other candidates, computing a data access availability and a data access requirement for calculating a distortion-based cost of a current candidate in the other candidates of the plurality of candidates; and if the data access requirement does not exceed the data access availability, calculating the distortion-based cost of the current candidate; otherwise, selecting the candidate with the minimum calculated distortion-based cost as a matched candidate for the current prediction target. Therefore, coding performance setback due to external memory data access is improved.

19 Claims, 10 Drawing Sheets

(51) Int. Cl.
*H04N 19/176* (2014.01)
*H04N 19/127* (2014.01)
*H04N 19/147* (2014.01)
*H04N 19/61* (2014.01)
*H04N 19/96* (2014.01)
*H04N 19/107* (2014.01)
*H04N 19/463* (2014.01)
*H04N 19/433* (2014.01)

(52) U.S. Cl.
CPC .............. *H04N 19/463* (2014.11); *H04N 19/61* (2014.11); *H04N 19/96* (2014.11)

(56) References Cited

U.S. PATENT DOCUMENTS

| | | | |
|---|---|---|---|
| 2003/0007558 A1* | 1/2003 | Vetro et al. | 375/240.03 |
| 2006/0188020 A1* | 8/2006 | Wang | 375/240.16 |
| 2007/0121731 A1 | 5/2007 | Tanizawa et al. | |
| 2008/0013628 A1* | 1/2008 | Lu et al. | 375/240.12 |
| 2009/0296816 A1 | 12/2009 | Drezner et al. | |
| 2009/0324112 A1 | 12/2009 | Park | |
| 2010/0195722 A1 | 8/2010 | Boon et al. | |
| 2011/0013697 A1 | 1/2011 | Choi et al. | |
| 2011/0170596 A1* | 7/2011 | Shi et al. | 375/240.16 |
| 2012/0230408 A1* | 9/2012 | Zhou | 375/240.15 |
| 2012/0263231 A1* | 10/2012 | Zhou | 375/240.12 |
| 2013/0016785 A1* | 1/2013 | Wang et al. | 375/240.16 |
| 2013/0039423 A1* | 2/2013 | Helle et al. | 375/240.13 |
| 2013/0044825 A1* | 2/2013 | Jalowiecki et al. | 375/240.26 |

FOREIGN PATENT DOCUMENTS

| | | |
|---|---|---|
| WO | 2008149840 | 12/2008 |
| WO | WO 2011128366 A1 * | 10/2011 |
| WO | WO 2011138584 A1 * | 11/2011 |

OTHER PUBLICATIONS

Chan-Sik et al., "Bus Bandwidth Aware H.264/AVC Motion Compensation Design for High Definition Video Encoding," in proceeding of IEEE International Workshop on Multimedia Signal Processing, Oct. 2007, pp. 276-279.

Arun S. Abraham et al., "Bandwidth-Aware Video Encoding with Adaptive Image Scaling," in proceeding of IEEE International Conference on Multimedia and Expo, Jun. 2004, pp. 157-160.

Wei-Cheng Tai et al., "Bandwidth-Rate-Distortion Optimized Motion Estimation," in proceeding of IEEE International Conference on Multimedia and Expo, Jun. 2009, pp. 161-164.

Jui-Hung Hsieh et al., "Memory Bandwidth-Scalable Motion Estimation for Mobile Video Coding," EURASIP Journal on Advances in Signal Processing, Dec. 2011.

Gwo-Long Li et al., "RD Optimized Bandwidth Efficient Motion Estimation and Its Hardware Design with On-Demand Data Access," IEEE Transactions on Circuits and Systems for Video Technology, Nov. 2010, vol. 20, No. 11, pp. 1565-1576.

Yu-De Wu et al., "A Novel Embedded Bandwidth-Aware Frame Compressor for Mobile Video Applications," in proceeding of International Symposium on Intelligent Signal Processing and Communication systems, Dec. 2008.

TIPO office action with an appended search report dated Mar. 3, 2015 for corresponding Taiwan application 101145227.

* cited by examiner

METHOD FOR PREDICTION IN IMAGE ENCODING AND IMAGE ENCODING APPARATUS APPLYING THE SAME

1. TECHNICAL FIELD

The present disclosure relates to an image encoding and, more particularly, to a method for prediction in image coding and an image encoding apparatus applying the same.

2. RELATED ART

Recent video coding standards provide significant video coding performance improvement by adopting motion vector prediction. Motion vector prediction achieves bitrate reduction by exploiting statistical redundancy among neighboring motion vectors spatially and temporally.

Neighboring motion vectors of a current block of which a motion vector is under prediction form a candidate set. The current block may be a partition of a coding tree unit (CTU) in High Efficiency Video Coding (HEVC) standard or a partition of a macroblock in H.264 Advanced Video Coding (AVC) standard, or the like. For each candidate set respective to a current block and for each candidate in the current candidate set, a distortion-based cost is computed so that the candidate with the minimum distortion-based cost may be selected for predicting the motion vector of the current block.

The distortion-based cost is calculated based on a pixel intensity difference between the current block of which the motion vector is under prediction and a reference block of a candidate motion vector. In order to obtain the pixel intensity of the reference block of the candidate motion vector, pixels of the reference block are fetched from an external memory through a system bus. Therefore, the calculation of the distortion-based cost may be subject to memory data access bandwidth limitation and data access time variation caused by other system modules sharing the memory resource.

In order to achieve higher coding performance, types of partitions of a CTU or macroblock evaluated and the number of neighboring motion vectors in a candidate set may be increased. However, with the increase in the number of candidates evaluated, memory data access become a performance bottleneck in image encoding apparatuses. FIG. 1 shows a comparison of a simulation result of memory data access required under merge mode of HEVC and a data access bandwidth of a typical DDR2 (Double Data Rate 2) memory at a clock rate of 133 MHz. Under merge mode, HEVC can achieve further bitrate reduction by signaling the index of the selected candidate and omitting coding of a residual signal. However, there are five candidates evaluated for each candidate set. In this simulation, it is assumed that the CTU size is 64×64 pixels; the maximum partition depth is 4; the frame rate is 30 frames/sec; the search range for motion estimation is ±8 pixels; and the asymmetric motion partition is enabled. The horizontal axis represents different frame resolution, and the vertical axis represents memory data access bandwidth. As shown in FIG. 1, for larger frame resolution sequences, such as frame resolution sequence 1080P and beyond, the memory data access required for merge mode far exceeds what a typical DDR2 memory can sustain.

Therefore, it is highly desirable that coding performance setback due to external memory data access is improved.

SUMMARY

The present disclosure is directed to a method for prediction in image coding and an image encoding apparatus applying the same that select a candidate from a candidate set for prediction based on the calculated distortion costs under a dynamically adjusted memory data access condition.

According to an embodiment, the method for prediction in image encoding includes the steps of: receiving a plurality of candidates with respect to a current prediction target of an image, wherein the plurality of candidates are related to the current prediction target spatially or temporally; calculating a distortion-based cost of a first candidate in the plurality of candidates; and for each of the other candidates in the plurality of candidates, computing a data access availability and a data access requirement for calculating a distortion-based cost of a current candidate in the other candidates of the plurality of candidates; and if the data access requirement does not exceed the data access availability, calculating the distortion-based cost of the current candidate; otherwise, selecting the candidate with the minimum calculated distortion-based cost as a matched candidate for the current prediction target.

According to an embodiment, the image encoding apparatus includes a system and external memory controller, a distortion-based cost calculation module and a data access condition computing module. The system and external memory controller is coupled to a system bus for accessing an external memory. The distortion-based cost calculation module is coupled to the system and external memory controller. The data access condition computing module is coupled to the system and external memory controller. The external memory controller is configured to receive a plurality of candidates with respect to a current prediction target of an image, wherein the plurality of candidates are related to the current prediction target spatially or temporally; control the distortion-based cost calculation module to calculate a distortion-based cost of a first candidate in the plurality of candidates; and for each of the other candidates in the plurality of candidates, control the data access condition computing module to compute a data access availability and a data access requirement for the system and external memory controller to control the distortion-based cost calculation module to calculate a distortion-based cost of a current candidate in the other candidates of the plurality of candidates; and if the data access requirement does not exceed the data access availability, control the distortion-based cost calculation module to calculate the distortion-based cost of the current candidate; otherwise, control the distortion-based cost calculation module to select the candidate with the minimum calculated distortion-based cost as a matched candidate for the current prediction target.

BRIEF DESCRIPTION OF THE DRAWINGS

The objectives and advantages of the present disclosure will become apparent upon reading the following description and upon reference to the accompanying drawings in which.

DESCRIPTION OF THE EMBODIMENTS

Figure 1:
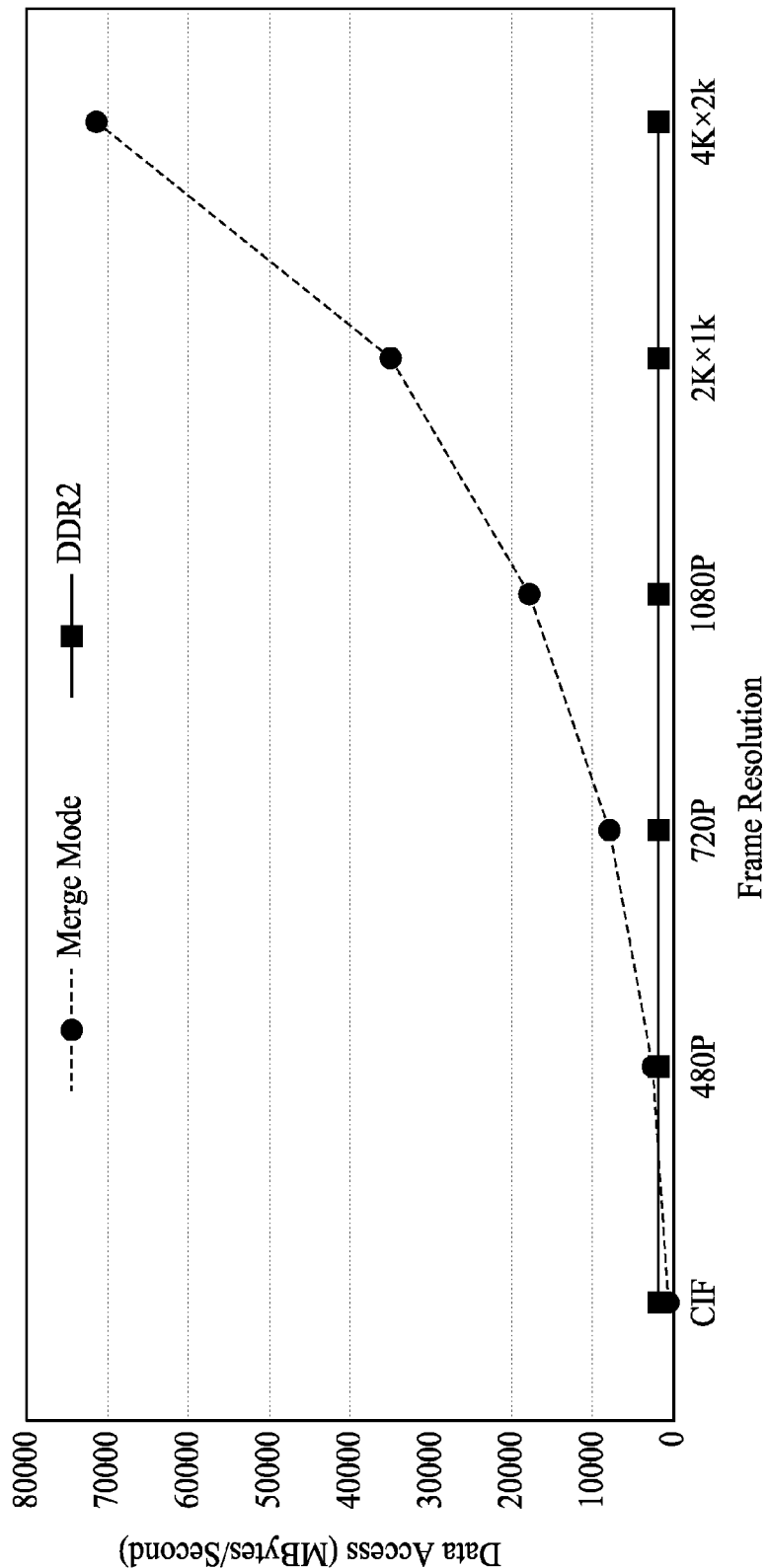
FIG. 1 shows a comparison of a simulation result of memory data access required under merge mode of HEVC and a data access bandwidth of a typical DDR2 memory at a clock rate of 133 MHz.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

Figure 2:
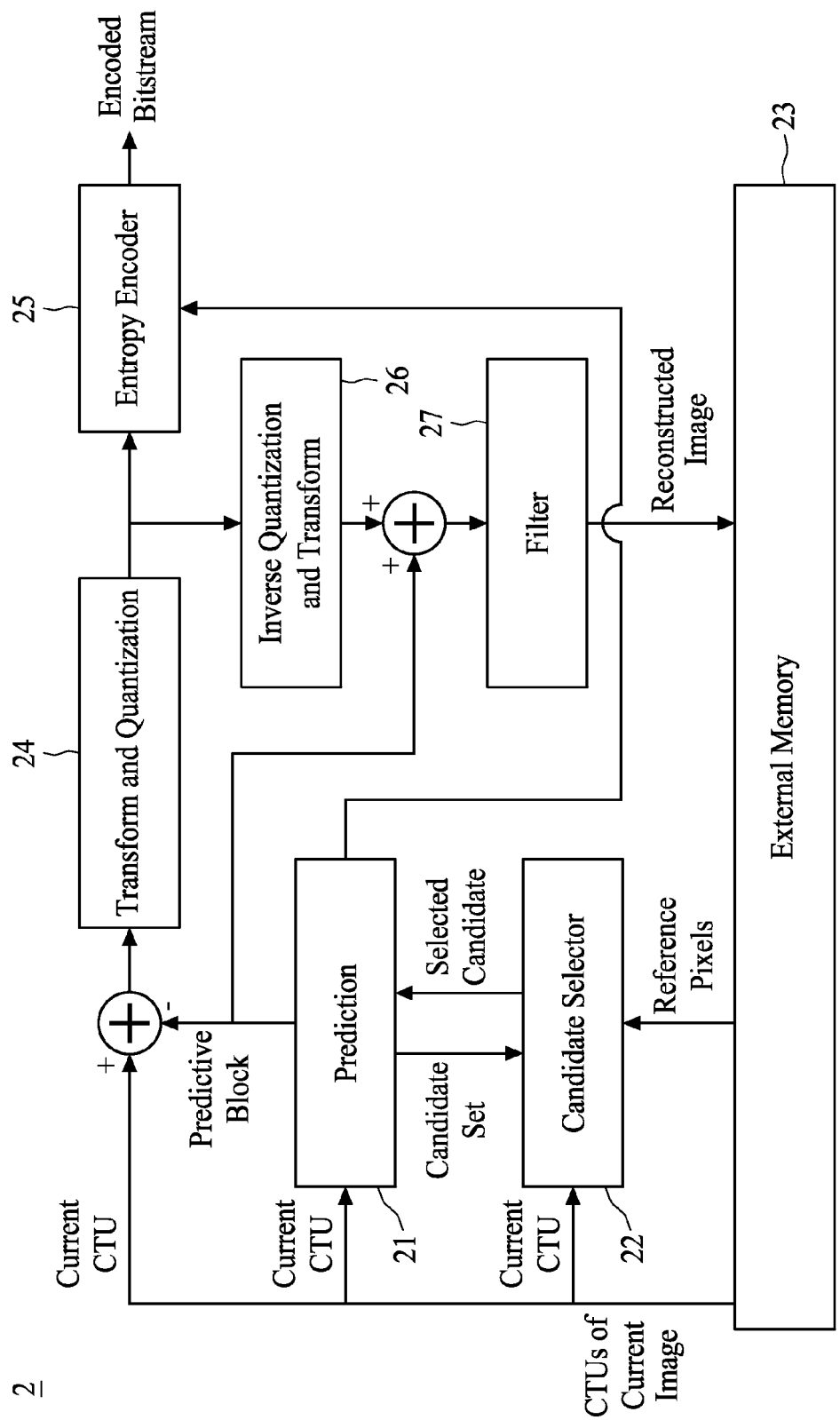
FIG. 2 is a block diagram schematically illustrating an image encoding apparatus according to an embodiment of the present disclosure.

FIG. 2 is a block diagram schematically illustrating an image encoding apparatus 2 according to an embodiment of the present disclosure. The image encoding apparatus 2 operates according to a video coding standard, such as the High Efficiency Video Coding (HEVC) standard, H.264 Advanced Video Coding (AVC) standard and the like. In general, the techniques of this disclosure are described with respect to HEVC, but it should be understood that these techniques may be used with other video coding standards as well.

The HEVC standard defines new terms for image blocks. In particular, image blocks (or partitions thereof) may be referred to as "coding units" (CUs). With the HEVC standard, image slices may be divided into coding tree units (CTUs), and CTUs may be further divided into finer and finer CUs according to the HEVC partitioning scheme, and different CUs that are defined in the scheme may be further partitioned into so-called prediction units (PUs). The CTUs, CUs, and PUs are all image blocks within the meaning of this disclosure.

The image encoding apparatus 2 as shown in FIG. 2 may be implemented as any of a variety of suitable encoding means, such as one or more microprocessors, digital signal processors (DSPs), application specific integrated circuits (ASICs), field programmable gate array (FPGAs), discrete logic, software, hardware, firmware or any combination thereof.

Referring to FIG. 2, the image encoding apparatus 2, according to an embodiment, includes a prediction unit 21, a candidate selector unit 22, an external memory 23, a transform and quantization unit 24, an entropy encoder unit 25, an inverse quantization and transform unit 26 and a filter unit 27. The image encoding apparatus 2 obtains CTUs of a current image to be encoded and outputs an encoded bitstream. The current image may be a video frame or slice.

Referring to FIG. 2, for each CTU of the current image, the prediction unit 21 performs candidate set construction for intra prediction, motion estimation of inter prediction and/or motion vector prediction of inter prediction. For intra prediction, a candidate set is constructed based on positions of neighboring CUs or PUs within the current image. For motion estimation of inter prediction, the candidate set is constructed based on positions of CUs or PUs in previous or subsequent reference images. For motion vector prediction of inter prediction, the candidate set is constructed based on neighboring motion vectors within the current image and/or previous or subsequent reference images. Then, the candidate selector unit 22 selects a candidate from the candidate set based on the calculated distortion-based costs under a dynamically adjusted memory data access condition for intra prediction, motion estimation of inter prediction, and/or motion vector prediction of inter prediction. The selected candidate for intra prediction or motion estimation of inter prediction may be used for compensating the current CTU to generate a predictive block. It is noted that as described above, the candidate selector unit 22 is not only suitable for motion vector prediction such as merge mode of HEVC, but may also be adapted for motion estimation or intra prediction.

Referring to FIG. 2, after generating the predictive block, the difference between the current CTU and the predictive block is obtained as residual data. The residual data may be transformed into transformed coefficients and quantized by the transform and quantization unit 24. The transform technique adopted may include Discrete Cosine Transformation (DCT), integer transforms, wavelet transforms, or the like. Quantization is applied to transformed coefficients, and involves a process that limits the number of bits associated with any given transformed coefficient. Then, the entropy encoder unit 25 may perform entropy encoding on the transformed and quantized residual data of the current image to obtain the encoded bitstream. Prediction information such as the prediction mode indicating the prediction technique employed, one or more motion vectors from motion estimation, and one or more motion vectors or motion vector indices from motion vector prediction may also be included in the entropy encoded bitstream. The entropy encoding technique adopted may include context adaptive binary arithmetic coding (CABAC), context adaptive variable length coding (CAVLC), or the like.

Referring to FIG. 2, in order to produce reference images for inter prediction, the transformed and quantized residual data may be input to the inverse quantization and transform block 26 which performs inverse operations of the transform and quantization unit 24. The reconstructed residual data from the inverse quantization and transform block 26 is combined with the predictive block generated by the prediction unit 21 to produce a reconstructed CTU. The reconstructed CTU is provided to the filter unit 27 which may include a deblocking filter and an adaptive loop filter and/or one or more in-loop filters to produce a reconstructed image which is saved in the external memory 23 as a reference image.

It is noted that in the present disclosure, the candidate selector 22 unit is separated from the prediction unit 21. Alternatively, the candidate selector unit 22 may also be integrated into the prediction unit 21.

Figure 3:
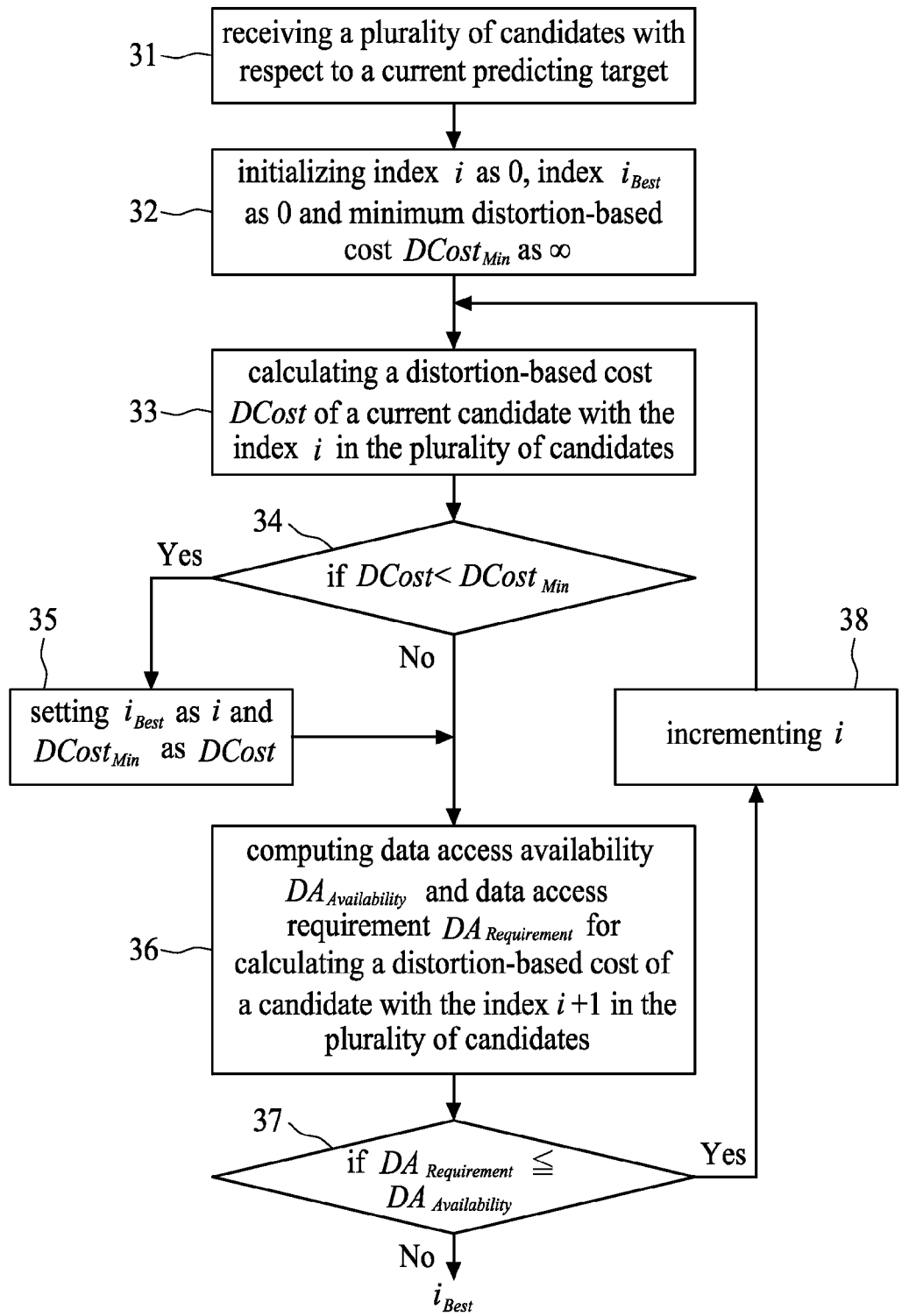
FIG. 3 is a flow chart illustrating a candidate selecting method according to an embodiment of the present disclosure.

FIG. 3 is a flow chart illustrating a candidate selecting method performed by the candidate selector unit 22 according to an embodiment of the present disclosure. Referring to FIG. 3, the candidate selecting method includes the following steps. In step 31, plurality of candidates $\{c_0, c_1, \ldots, c(n-1)\}$ with respect to a current prediction target is received, wherein the plurality of candidates $\{c_0, c_1, \ldots, c(n-1)\}$ are related to the current prediction target spatially or temporally. In step 32, indices i and $i_{Best}$ are initialized as 0 and a minimum distortion-based cost $DCost_{Min}$ is initialized as ∞. In step 33, a distortion-based cost DCost of a current candidate with the index i in the plurality of candidates $\{c_0, c_1, \ldots, c(n-1)\}$ is calculated. Since the index i is equal to 0 at this point, the current candidate is the first candidate c0. In step 34, if the distortion-based cost DCost of the current candidate is less than the minimum distortion-based cost $DCost_{Min}$, the index $i_{Best}$ is set as i and the minimum distortion-based cost $DCost_{Min}$ is set as DCost in step 35.

Then, the following operations are performed for each of the other candidates {c1, ..., c(n−1)} in the plurality of candidates {c0, c1, ..., c(n−1)}. In step 36, a data access availability $DA_{Availability}$ and a data access requirement $DA_{Requirement}$ for calculating a distortion-based cost of a candidate with the index i+1 in the other candidates {c1, ..., c(n−1)} of the plurality of candidates {c0, c1, ..., c(n−1)} is computed. In step 37, if the data access requirement $DA_{Requirement}$ does not exceed the data access availability $DA_{Availability}$, the index i is incremented in step 38, and the steps 33, 34 and maybe 35 are repeated for the current candidate with index i; otherwise, the candidate with the index $i_{Best}$ which has the minimum calculated distortion-based cost $DCost_{Min}$ is selected as a matched candidate for the current prediction target. It is noted that in step 36, the candidate with the index i+1 before the index i is incremented in step 38 is the same as the current candidate with the index i in step 33 performed after the index i is incremented in step 38.

Figure 4:
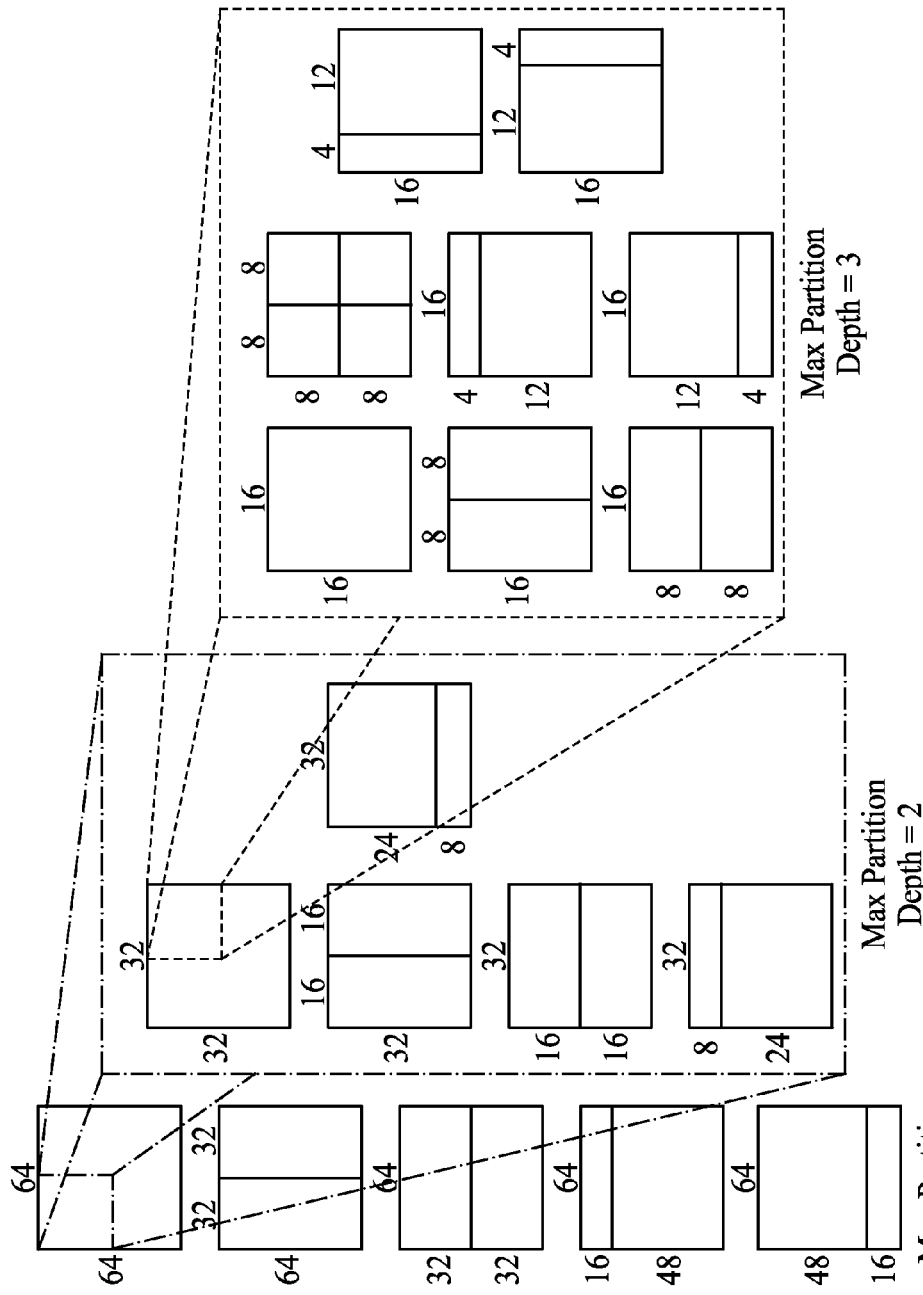
FIG. 4 is a schematic diagram illustrating a variety of prediction targets according to an embodiment of the present disclosure.
Figure 5:
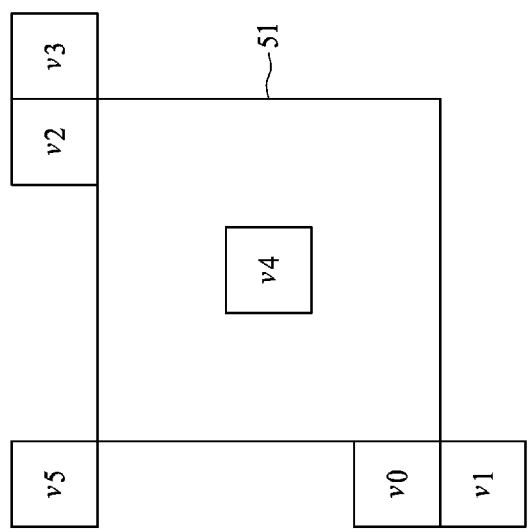
FIG. 5 is a schematic diagram illustrating candidate motion vectors for predicting a motion vector of a current prediction target according to an embodiment of the present disclosure.

Further details of some of the steps shown in FIG. 3 according to a first embodiment are provided in the following. In step 31, a plurality of candidates {c0, c1, ..., c(n−1)} with respect to a current prediction target is received, wherein the plurality of candidates {c0, c1, ..., c(n−1)} are related to the current prediction target spatially or temporally. According to an embodiment, for the current CTU of the current image, the prediction unit 21 shown in FIG. 2 performs candidate set construction for motion vector prediction of inter prediction. Each candidate set includes a plurality of candidates. According to an embodiment, a candidate set is constructed under merge mode of HEVC. In this embodiment, a prediction target is a partition of a current CTU, which may be a CU or PU, the current prediction target is a current CU or PU being evaluated and the candidates are candidate motion vectors for predicting a motion vector of the current CU or PU. FIG. 4 is a schematic diagram illustrating a variety of prediction targets according to an embodiment of the present disclosure. FIG. 5 is a schematic diagram illustrating candidate motion vectors for predicting a motion vector of a current prediction target according to an embodiment of the present disclosure. As shown in FIG. 4, there may be a variety of ways to partition the current CTU. According to an embodiment, if the maximum partition depth is 1, the current CTU with 64×64 pixels may be left as a single CU or partitioned into two 64×32 PUs, two 32×64 PUs, a 16×64 PU and a 48×64 PU, a 48×64 PU and a 16×64 PU, or other types of partitions. If the maximum partition depth is 2, the current CTU with 64×64 pixels may be further partitioned into four 32×32 CUs, and each 32×32 CU may be left as a single CU, or partitioned into two 32×16 PUs, two 16×32 PUs, a 8×32 PU and a 24×32 PU, a 24×32 PU and a 8×32 PU, or other types of partitions. If the maximum partition depth is 3, the 32×32 CU may be further partitioned into four 16×16 CUs, and each 16×16 CU may be left as a single CU, or partitioned into two 16×8 PUs, two 8×16 PUs, four 8×8 PUs, a 4×16 PU and a 12×16 PU, and a 12×16 PU and a 4×16 PU, a 16×4 PU and a 16×12 PU, a 16×12 PU and a 16×4 PU, or other types of partitions. As shown in FIG. 5, according to an embodiment, the candidate set constructed for the current prediction target 51, which may be any of the partition shown in FIG. 4, includes five of the six candidate motion vectors v0-v5. The candidate motion vectors v0 and v1 are located adjacent to the lower left portion of the current prediction target 51; the candidate motion vectors v2 and v3 are located adjacent to the upper right portion of the current prediction target 51, the candidate motion vector v4 is located in a collocated CU or PU in a reference image; and the candidate motion vector v5 is located adjacent to the upper left portion of the current prediction target 51, which may supplement the candidate set if any of the candidate motion vectors v0-v3 is invalid. The candidates v0-v3 and v5 are related to the current prediction target 51 spatially, and the candidate v4 is related to the current prediction target 51 temporally. Therefore, if there are m prediction targets, a candidate set is constructed for each respective prediction target PT0, PT1, ... or PTm and the candidate selecting method may be performed for each prediction target.

In step 33, a distortion-based cost DCost of a current candidate with the index i in the plurality of candidates {c0, c1, ..., c(n−1)} is calculated based on the result of the following equation.

$$\text{Distortion Cost} = \Sigma\Sigma |I(Pix_{curr}(x,y)) - I(Pix_{ref}(x',y'))| \quad (1)$$

wherein I(.) denotes a function to obtain pixel intensity, $Pix_{curr}(x,y)$ denotes a current pixel at a position (x, y) in the current prediction target in the current image, $Pix_{ref}(x',y')$ denotes a reference pixel at a position (x', y') associated with the current candidate. Both pixels of the current prediction target and reference pixels for the current candidate require external memory data access. Since the distortion cost is calculated for each evaluated candidate, the more the candidates evaluated, the higher the memory bandwidth required. According to an embodiment, the distortion-based cost is a rate distortion cost calculated by following:

$$\text{RDCost} = \text{Distortion Cost} + \lambda \cdot R(ci) \quad (2)$$

wherein RDCost denotes the rate distortion cost, λ represents a Lagrange parameter, R(ci) denotes a function to obtain rates to represent the current candidate ci.

Figure 6:
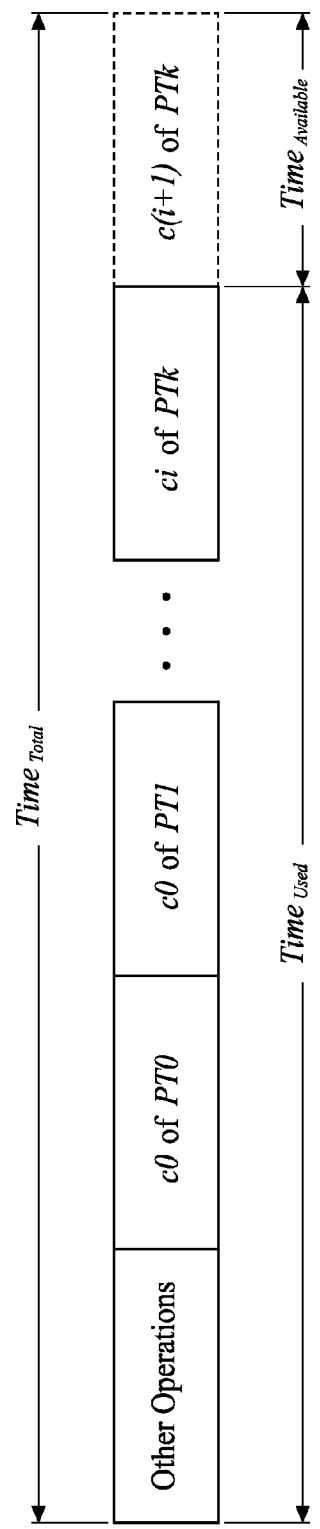
FIG. 6 is a timing diagram for calculating a data access condition according to an embodiment of the present disclosure.

In step 36, a data access availability $DA_{Availability}$ and a data access requirement $DA_{Requirement}$ for calculating a distortion-based cost of a candidate with the index i+1 in the other candidates {c1, ..., c(n−1)} of the plurality of candidates {c0, c1, ..., c(n−1)} is computed. The data access availability $DA_{Availability}$ and the data access requirement $DA_{Requirement}$ are used for evaluate a data access condition. FIG. 6 is a timing diagram for calculating a data access condition according to an embodiment of the present disclosure. The data access availability $DA_{Availability}$ is derived using available time $Time_{Available}$ in allotted time $Time_{Total}$ for encoding one unit region, a CTU, of an image. The available time $Time_{Available}$ is calculated by following:

$$Time_{Available} = Time_{Total} - Time_{Used} \quad (3)$$

wherein $Time_{Available}$ denotes the available time; $Time_{Total}$ denotes the allotted time for encoding one CTU of the image; $Time_{Used}$ denotes used time for operations including calculating a distortion-based cost for each candidate c0, c1, ... or c(n−1) for each previous prediction target PT0, ..., or PT(k−1) with respect to the current prediction target PTk and for each previous candidate c0, ..., or ci with respect to the candidate c(i+1) for the current prediction target PTk. As shown in FIG. 6, the used time for the operations described above are accumulated into $Time_{Used}$. According to an embodiment, other operations such as from prediction unit 21 shown in FIG. 2 may also be accumulated into $Time_{Used}$.

According to a software embodiment of the present disclosure, the data access availability $DA_{Availability}$ and data access requirement $DA_{Requirement}$ may be expressed in terms of time and are equal to the available time $Time_{Available}$ and a required time $Time_{Required}$ for performing operations including calculating the distortion-based cost for the candidate c(i+1), respectively.

Figure 7:
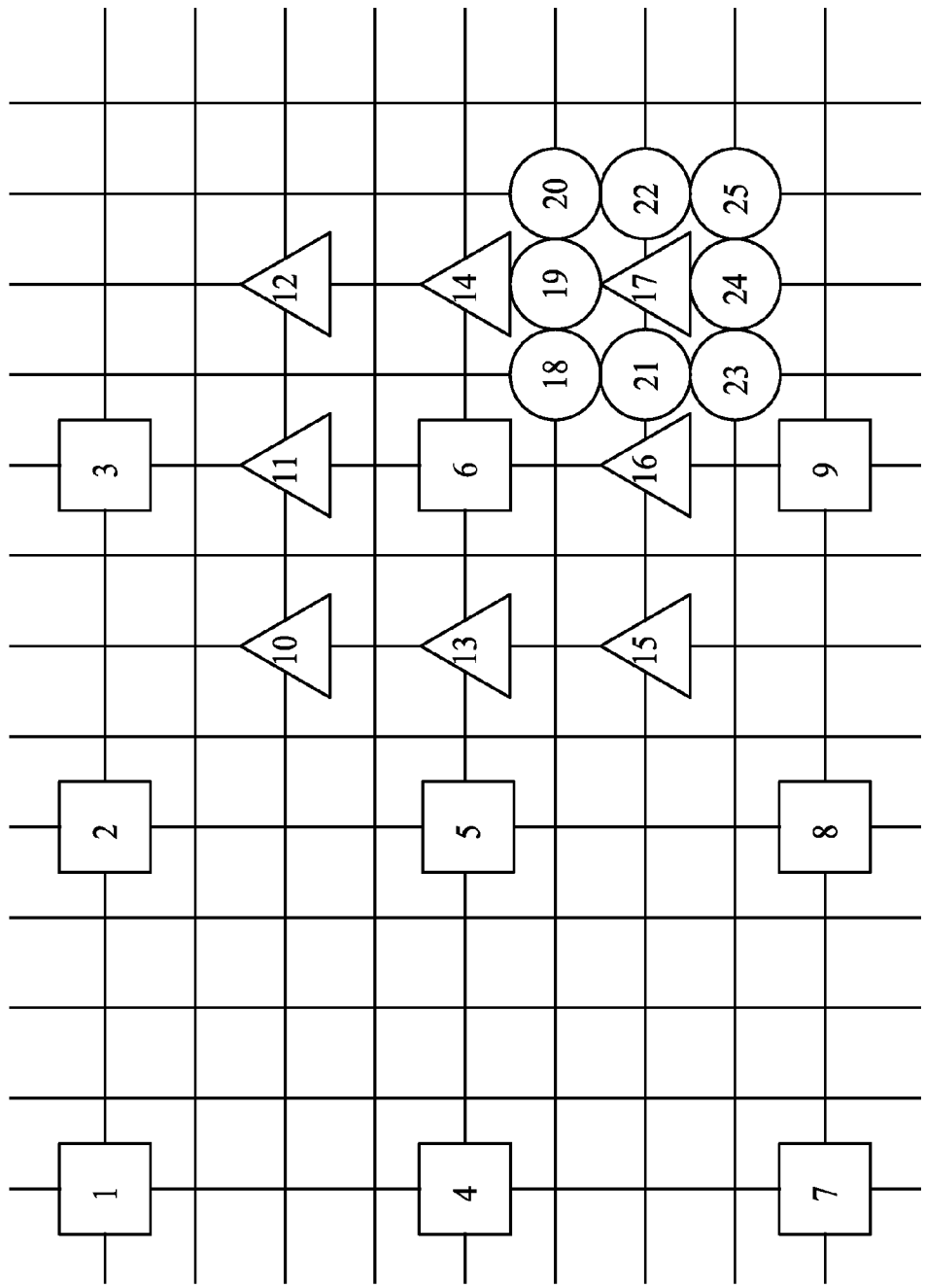
FIG. 7 is a schematic diagram illustrating candidate positions of predictive blocks for predicting the current predicting target according to an embodiment of the present disclosure.

Further details of some of the steps shown in FIG. 3 according to a second embodiment are provided in the following. In step 31, a plurality of candidates {c0, c1, ..., c(n−1)} with respect to a current prediction target is received, wherein the plurality of candidates {c0, c1, ..., c(n−1)} are related to the current prediction target spatially or temporally. According to an embodiment, for the current CTU of the current image, the prediction unit 21 shown in FIG. 2 performs candidate set construction for motion estimation of inter prediction. Each candidate set includes a plurality of candidates. According to an embodiment, a candidate set is constructed according to a fast block-matching method that performs block matching on selected positions such as a three-step search (TSS) method. In this embodiment, a prediction target is a partition of a current CTU (or a marcoblock), which may be a CU or PU (or a macroblock or a subblock), the current prediction target is a current CU or PU being evaluated and the candidates are candidate positions of predictive blocks in a reference frame for predicting the current CU or PU. As shown in FIG. 4, there may be a variety of ways to partition the current CTU. Detail description for various types of partitions is provided above and omitted here for brevity. FIG. 7 is a schematic diagram illustrating candidate positions of predictive blocks for predicting the current predicting target according to an embodiment of the present disclosure. As illustrated in FIG. 7, in a first step of the TSS method, a candidate set constructed for the current prediction target, which may be any of the partition shown in FIG. 4, includes candidate positions 1-9 shown in box; in a second step of the TSS method, a refined candidate set constructed for the current prediction target includes candidate positions 10-17 shown in triangle; and in a third step of the TSS method, a further refined candidate set constructed for the current prediction target, includes candidate positions 18-25 shown in circle. All of the candidates 1-25 are related to the current prediction target temporally. Therefore, if there are m prediction targets, three candidate sets are constructed for each respective prediction target 0, 1, ... or m and the candidate selecting method may be performed for each candidate set of each prediction target, or alternatively, the candidate selecting method may be performed for only the further refined candidate set of each prediction target.

Detail description of the steps 33 and 36 according to the first embodiment also applies to the second embodiment and is omitted here for brevity.

Figure 8:
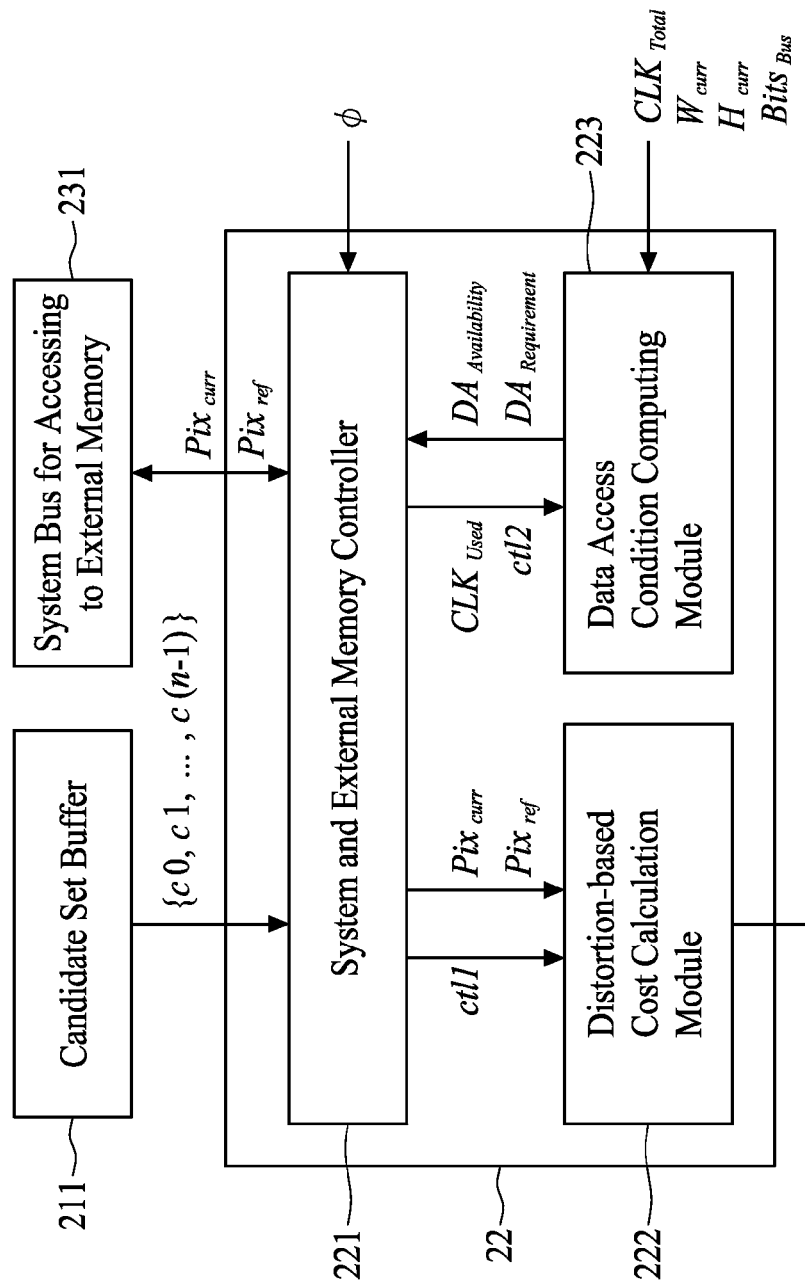
FIG. 8 is a schematic block diagram illustrating a candidate selector unit according to an embodiment of the present disclosure.

FIG. 8 is a schematic block diagram illustrating the candidate selector unit 22 according to a hardware embodiment of the present disclosure. Referring to FIG. 8, according to an embodiment, the candidate selector unit 22 includes a system and external memory controller 221, a distortion-based cost calculation module 222 and a data access condition computing module 223. The system and external memory controller 221 is coupled to a system bus 231 for accessing the external memory 23 shown in FIG. 2. The distortion-based cost calculation module 222 and data access condition computing module 223 are coupled to the system and external memory controller 221.

Referring to FIG. 8, the system and external memory controller 221 is configured to perform the following operations. First, a plurality of candidates {c0, c1, ..., c(n−1)} with respect to a current prediction target are received from a candidate set buffer 211, wherein the plurality of candidates {c0, c1, ..., c(n−1)} are related to the current prediction target spatially or temporally. Alternatively, the plurality of candidates {c0, c1, ..., c(n−1)} may be received one by one. Detail description for the received candidates under different prediction modes is provided above and are omitted here for brevity. Then, the distortion-based cost calculation module 222 is controlled to calculate a distortion-based cost of a first candidate c0 in the plurality of candidates {c0, c1, ..., c(n−1)}. According to an embodiment, the system and external memory controller 221 accesses pixels $Pix_{curr}$ of the current prediction target and reference pixels $Pix_{ref}$ for the first candidate c0 from the external memory and controls the distortion-based cost calculation module 222 to calculate a distortion-based cost of the first candidate c0 in the plurality of candidates {c0, c1, ..., c(n−1)} by generating a control signal ctl1 and providing the pixels $Pix_{curr}$ and $Pix_{ref}$. Detail description for calculating a distortion-based cost is provided above and is omitted here for brevity.

Then, the following operations are performed for each of the other candidates {c1, ..., cn} in the plurality of candidates {c0, c1, ..., c(n−1)}. The data access condition computing module 223 is controlled to compute a data access availability $DA_{Availability}$ and a data access requirement $DA_{Requirement}$ for the system and external memory controller 221 to control the distortion-based cost calculation module 222 to calculate a distortion-based cost of a current candidate in the other candidates {c1, ..., c(n−1)} of the plurality of candidates {c0, c1, ..., c(n−1)}. If the data access requirement $DA_{Requirement}$ does not exceed the data access availability $DA_{Availability}$, the distortion-based cost calculation module 222 is controlled to calculate the distortion-based cost of the current candidate. The operations for calculating the distortion-cost of the current candidate is similar to those for the first candidate c0. If the data access requirement $DA_{Requirement}$ exceeds the data access availability $DA_{Availability}$, the distortion-based cost calculation module 222 is controlled to select the candidate with the minimum calculated distortion-based cost as a matched candidate for the current prediction target.

According to an embodiment, in order for the data access condition computing module 223 to compute the data access availability $DA_{Availability}$ and the data access requirement $DA_{Requirement}$ for the current candidate, the following operations are performed. Referring to FIGS. 6 and 8, the system and external memory controller 221 receives a system clock rate Φ and calculates used time $CLK_{Used}$ in clock cycles for operations including calculating a distortion-based cost for each candidate c0, c1, ... or c(n−1) for each previous prediction target PT0, ..., or PT(k−1) with respect to the current prediction target PTk and for each previous candidate c0, ..., or ci with respect to the candidate c(i+1) for the current prediction target PTk. The used time in clock cycles for the operations described above are accumulated into $CLK_{Used}$. According to an embodiment, other operations such as from prediction unit 21 shown in FIG. 2 may also be accumulated into $CLK_{used}$.

Continuing the above description, the data access condition computing module 223 receives a control signal ctl2 generated by the system and external memory controller 221 and the used time $CLK_{Used}$ from the system and external memory controller 221. The data access condition computing module 223 also receives an allotted time $CLK_{Total}$ for encoding one unit region, a CTU, of an image in clock cycles, a width $W_{curr}$ and height $H_{curr}$ associated with the current prediction target and a bandwidth $Bits_{BUS}$ of the system bus 231. The allotted time $CLK_{Total}$ may be calculated by the following equation:

$$CLK_{Total} = \frac{\Phi}{CTU_{Width} \cdot CTU_{Height} \cdot FR} \quad (4)$$

where Φ denotes the system clock rate, $CTU_{Width}$ and $CTU_{Height}$ represent the number of CTUs along a width and height of an image for encoding, respectively, and FR represents a frame rate.

According to an embodiment, the data access condition computing module 223 derives the data access availability $DA_{Availability}$ using available time $CLK_{Available}$ in allotted time $CLK_{Total}$ for encoding one unit region, a CTU, of an image and the available time $CLK_{Available}$ is calculated by following:

$$CLK_{Available} = CLK_{Total} - CLK_{Used} \quad (5)$$

Then, the data access condition computing module 223 computes the data access availability $DA_{Availability}$ and the data access requirement $DA_{Requirement}$ respectively by following:

$$BW_{Available} = \lfloor CLK_{Available} \ll \log_2 Bits_{BUS} \rfloor \gg 3 \quad (6)$$

$$BW_{Required} = W_{curr} \cdot H_{curr} \quad (7)$$

wherein $BW_{Available}$ and $BW_{Required}$ are respectively the data access availability $DA_{Availability}$ and data access requirement $DA_{Requirement}$ expressed in terms of bandwidth. Equation (6) means to multiply the available time $CLK_{Available}$ by the bandwidth $Bit_{BUS}$ of the external memory (i.e. left shift $CLK_{Available}$ by $\log_2 Bits_{BUS}$ bits), take the floor of the result and express in terms of bytes (i.e. right shift 3 bits).

It is noted that in the present disclosure, the data access condition may be adjusted tighter or looser. For example, in the embodiment shown in FIG. 3, the allotted time $Time_{Total}$ for encoding a CTU of an image or the time for accessing the external memory to calculate a distortion-based cost of a candidate (which affects the used time $Time_{Used}$) may be adjusted. In the embodiment shown in FIG. 8, the system clock rate Φ, the allotted time $CLK_{Total}$ for encoding a CTU of an image in clock cycles or the time for accessing external memory to calculate a distortion-based cost of a candidate (which affects the used time $CLK_{Used}$ in clock cycles) may be adjusted. Referring to FIG. 2, depending on the data access condition imposed on the candidate selector unit 22 being tighter or looser, the encoded bitstream output from the image encoding apparatus 2 may be changed accordingly. For example, when the data access condition is tighter, a less optimal candidate may be selected and there will be more number of bits in the bitstream. When the data access condition is looser, a more optimal candidate may be selected and there will be less number of bits in the bitstream.

Figure 9:
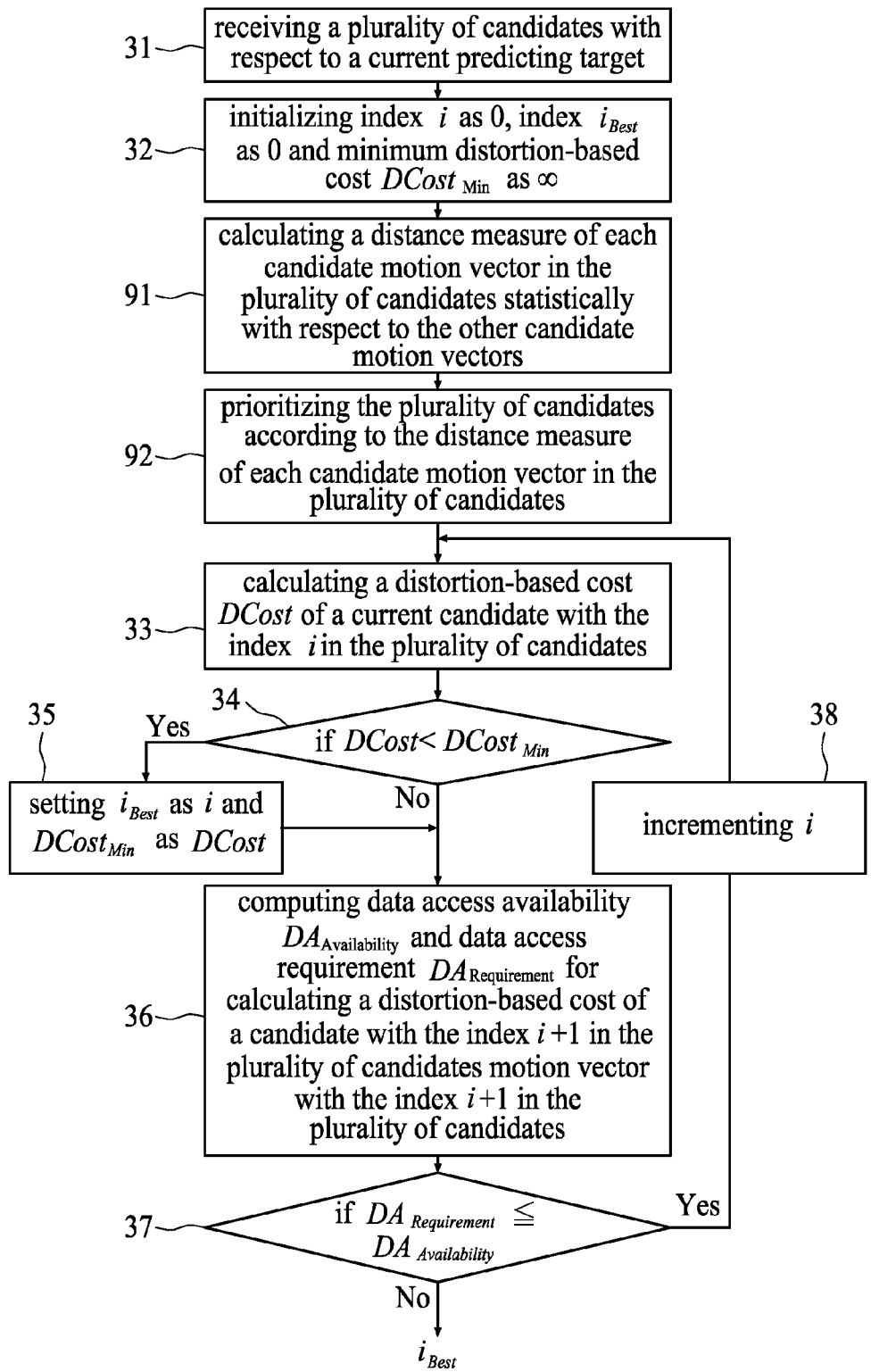
FIG. 9 is a flow chart illustrating a candidate selecting method with candidate prioritization according to an embodiment of the present disclosure.

Referring to FIG. 2, in the embodiment where the prediction unit 21 performs motion vector prediction of inter prediction, candidates in a candidate set may be prioritized in the candidate selector unit 22. Accordingly, a candidate set is a candidate motion vector set and candidates are candidate motion vectors. FIG. 9 is a flow chart illustrating a candidate selecting method with candidate prioritization performed by the candidate selector unit 22 according to an embodiment of the present disclosure. Referring to FIG. 9, the candidate selecting method with candidate prioritization further includes the following steps in addition to the steps of the candidate selecting method described above and shown in FIG. 3. In step 31, a plurality of candidates {c0, c1, . . . , c(n−1)} are received in step 31, where in the plurality of candidates {c0, c1, . . . , c(n−1)} is the candidate motion vector set {v0, v1, . . . , v(n−1)}. In the following, the plurality of candidates and the candidate motion vector set are used interchangeably. Then, in step 91, a distance measure of each candidate motion vector v0, v1, . . . , or vn statistically with respect to other candidate motion vectors in the plurality of candidates {v0, v1, . . . , v(n−1)} are calculated. In step 92, the plurality of candidates {v0, v1, . . . , v(n−1)} are prioritized according to the distance measure of each candidate motion vector v0, v1, . . . , or v(n−1) in the plurality of candidates {v0, v1, . . . , v(n−1)}. According to an embodiment, the plurality of candidates {v0, v1, . . . , v(n−1)} are prioritized in ascending order according to the distance measure of each candidate motion vector v0, v1, . . . , or v(n−1). Detail description of the steps in FIG. 9 which are similar to those in FIG. 3 have been provided above and are omitted here for brevity.

Further details of the step 91 are provided in the following. In step 91, a distance measure of each candidate motion vector v0, v1, . . . , or v(n−1) statistically with respect to other candidate motion vectors in the candidate motion vector set {v0, v1, . . . , v(n−1)} are calculated. According to an embodiment, the distance measure of a candidate under measure vi in the candidate motion vector set {v0, v1, . . . , v(n−1)} may be calculated by the following equation:

$$D_i = \sum_{j=0}^{n-1} d_{ij} \quad (8)$$

wherein $D_i$ denotes the distance measure of the candidate under measure vi; n denotes the number of candidate motion vectors in the candidate motion vector set {v0, v1, . . . , v(n−1)} and $d_{ij}$ denotes a distance of the candidate under measure with an index i to a candidate motion vector with an index j in the candidate motion vector set {v0, v1, . . . , v(n−1)}, and $d_{ij}$ is calculated by following:

$$d_{ij} = |vi_x - vj_x| + |vi_y - vj_y| \quad (9)$$

wherein $vi_x$ and $vi_y$ respectively denote x and y components of the candidate under measure vi; and $vj_x$ and $vj_y$ respectively denote x and y components of the candidate motion vector with the index j.

Alternatively, according to an embodiment, the distance measure of a candidate under measure vi in the candidate motion vector set {v0, v1, . . . , v(n−1)} may be calculated by the following equation:

$$D_i = |vi_x - MV_{Center\_x}| + |vi_y - MV_{Center\_y}| \quad (10)$$

wherein $D_i$ denotes the distance measure of the candidate under measure vi; $vi_x$ and $vi_y$ respectively denote x and y components of the candidate under measure vi; and $MV_{Center\_x}$ and $MV_{Center\_y}$ respectively denote x and y components of a motion vector center.

With respect to the motion vector center, according to an embodiment, the x and y components of the motion vector center are respectively calculated by following:

$$MV_{Center\_x} = \frac{\arg\max_{0 \le j < n-1} \{vj_x\} + \arg\min_{0 \le j < n-1} \{vj_x\}}{2} \quad (11)$$

$$MV_{Center\_y} = \frac{\arg\max_{0 \le j < n-1} \{vj_y\} + \arg\min_{0 \le j < n-1} \{vj_y\}}{2}$$

wherein $vj_x$ and $vj_y$ respectively denote x and y components of a candidate motion vector in the candidate motion vector set {v0, v1, . . . , v(n−1)} with an index j, and n denotes the number of candidate motion vectors in the candidate motion vector set {v0, v1, . . . , v(n−1)}. The operation $$"\arg\max_{0 \le j < n-1} \{.\}"$$

obtains the element with the maximum value in the set with n elements.

With respect to the motion vector center, according to another embodiment, the x and y components of the motion vector center are respectively calculated by following:

$$MV_{Center\_x} = \frac{1}{n}\sum_{j=0}^{n-1} vj_x \quad (12)$$

$$MV_{Center\_y} = \frac{1}{n}\sum_{j=0}^{n-1} vj_y$$

wherein $vj_x$ and $vj_y$ respectively denote x and y components of a candidate motion vector in the candidate motion vector set {v0, v1, . . . , v(n−1)} with an index j, and n denotes the number of candidate motion vectors in the candidate motion vector set {v0, v1, . . . , v(n−1)}.

Figure 10:
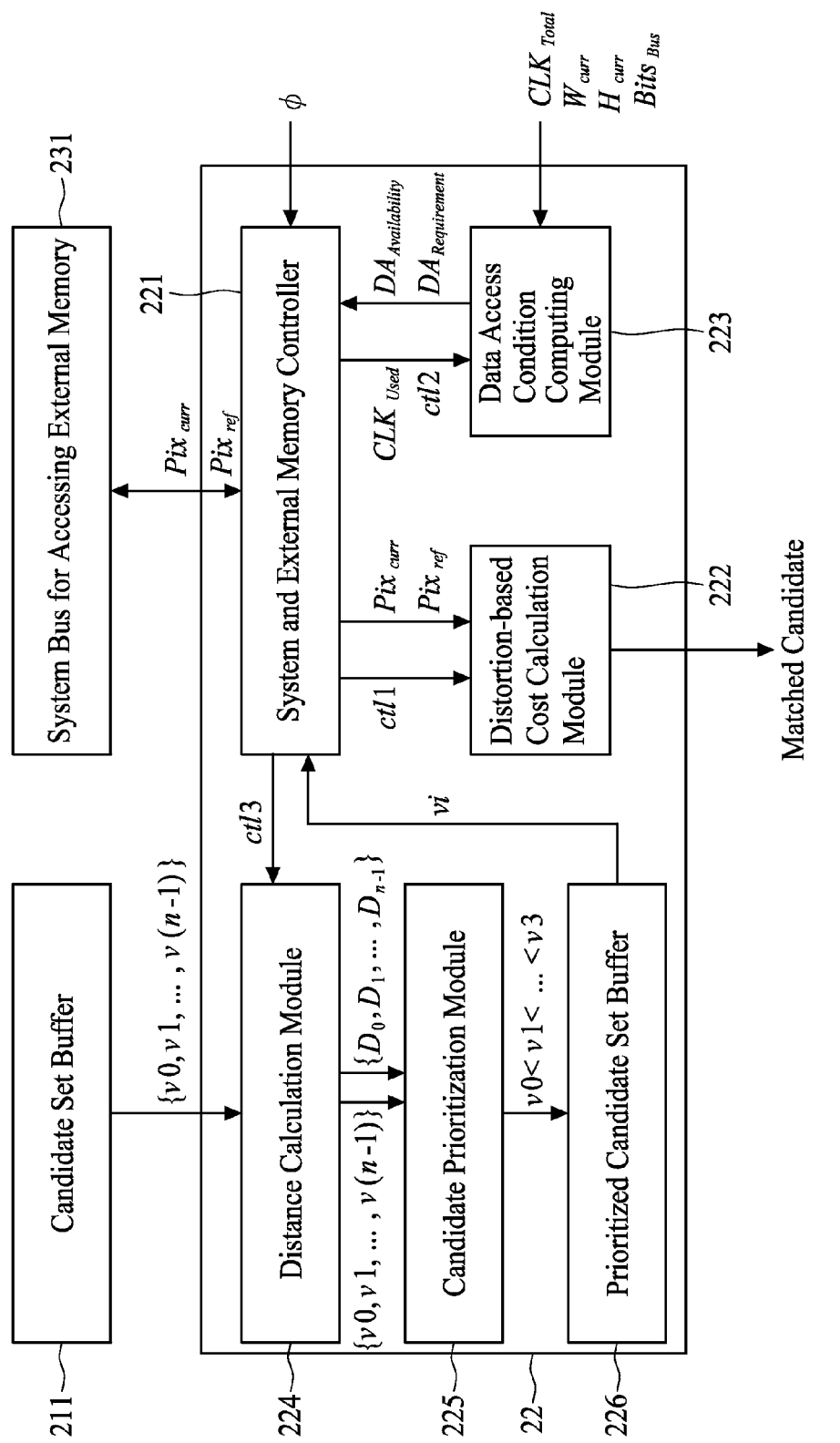
FIG. 10 is a schematic block diagram illustrating a candidate selector unit with candidate prioritization according to an embodiment of the present disclosure.

FIG. 10 is a schematic block diagram illustrating the candidate selector unit 22 with candidate prioritization according to an embodiment of the present disclosure. Referring to FIG. 10, the candidate selector unit 22 with candidate prioritization further includes a distance calculation module 224, a candidate prioritization module 225 and a prioritized candidate set buffer 226. Detail description of the modules in FIG. 10 which are similar to those in FIG. 8 have been provided above and are omitted here for brevity.

According to an embodiment, the distance calculation 224 is configured to receive the candidate motion vector set {v0, v1, . . . , v(n−1)} and calculate a distance measure $D_i$ of each candidate motion vector v0, v1, . . . , or v(n−1) in the candidate motion vector set {v0, v1, . . . , v(n−1)} statistically with respect to the other candidate motion vectors, and may be controlled by the system and external memory controller 221 with a control signal ctl3. Details for calculating the distance measure $D_i$ for of each candidate motion vector v0, v1, . . . , or v(n−1) have been provided above and are omitted here for brevity. The distance calculation module 224 provides the received candidate motion vector set {v0, v1, . . . , v(n−1)} and the calculated distance measures {$D_0, D_1, \ldots, D_{n-1}$} to the candidate prioritization module 225.

According to an embodiment, the candidate prioritization module 225 is configured to prioritize the candidate motion vector set {v0, v1, . . . , v(n−1)} according to the distance measure $D_i$ of each candidate motion vector v0, v1, . . . , or v(n−1) in the candidate motion vector set {v0, v1, . . . , v(n−1)}. According to an embodiment, the candidate motion vector set {v0, v1, . . . , v(n−1)} is prioritized in ascending order according to the distance measure $D_i$ of each candidate motion vector v0, v1, . . . , or v(n−1) in the candidate motion vector set {v0, v1, . . . , v(n−1)}. According to an embodiment, the candidate prioritization module 225 is coupled to the system and external memory controller 221 through the prioritized candidate set buffer 226. The candidate prioritization module 225 stores the prioritized candidate motion vector set in the prioritized candidate set buffer 226 in order, and the system and external memory controller 221 accesses each candidate motion vector vi in order.

In summary, the present disclosure is directed to a method for prediction in image encoding and an image encoding apparatus applying the same that select a candidate from a candidate set for prediction based on the calculated distortion costs under a dynamically adjusted memory data access condition. Therefore, the coding performance setback due to external memory data access is improved. In addition, when the candidate set is a candidate motion vector set, it may be prioritized according to a statistically obtained distance measure of each candidate to further enhance coding performance.

It will be apparent to those skilled in the art that various modifications and variations can be made to the disclosed embodiments. It is intended that the specification and examples be considered as exemplary only, with a true scope of the disclosure being indicated by the following claims and their equivalents

What is claimed is:

1. A method for prediction in image encoding, comprising the steps of:
receiving a plurality of candidates with respect to a current prediction target of an image, wherein the plurality of candidates are related to the current prediction target spatially or temporally;
calculating a distortion-based cost of a first candidate in the plurality of candidates; and
for each of the other candidates in the plurality of candidates,
computing a data access availability and a data access requirement for calculating a distortion-based cost of a current candidate in the other candidates of the plurality of candidates; and
if the data access requirement does not exceed the data access availability, calculating the distortion-based cost of the current candidate; otherwise, selecting the candidate with the minimum calculated distortion-based cost as a matched candidate for the current prediction target,
wherein the data access availability and the data access requirement are represented respectively by the following:

$$BW_{Available} = \lfloor CLK_{Available} \ll \log_2 Bits_{BUS}\rfloor \gg 3$$

$$BW_{Required} = W_{curr} \cdot H_{curr}$$

wherein $BW_{Available}$ and $BW_{Required}$ are respectively the data access availability and data access requirement expressed in terms of bandwidth; $Bits_{Bus}$ denotes a bandwidth of the system bus; and $W_{curr}$ and $H_{curr}$ are respectively a width and height of a region in the image associated with the current prediction target.

2. The method of claim 1, wherein the data access availability is derived using available time in allotted time for encoding one unit region of the image and the available time is calculated by following:

$$Time_{Available} = Time_{Total} - Time_{Used}$$

wherein $Time_{Available}$ denotes the available time; $Time_{Total}$ denotes the allotted time for encoding one unit region of the image; $Time_{used}$ denotes used time for operations comprising calculating a distortion-based cost for each candidate for each previous prediction target with respect to the current prediction target and for each previous candidate with respect to the current candidate for the current prediction target.

3. The method of claim 2, wherein the data access availability and data access requirement are expressed in terms of time, and the data access availability is the available time and the data access requirement is the required time for operations comprising calculating the distortion-based cost for the current candidate.

4. The method of claim 1, wherein the current prediction target is a motion vector of the region in the image, and the plurality of candidates is a candidate motion vector set comprising a plurality of candidate motion vectors for predicting the current prediction target, and the method further comprises the steps of:

calculating a distance measure of each candidate motion vector in the candidate motion vector set statistically with respect to the other candidate motion vectors; and prioritizing the candidate motion vector set according to the distance measure of each candidate motion vector in the candidate motion vector set.

5. The method of claim 4, wherein the distance measure of a candidate under measure in a candidate motion vector set is calculated by following:

$$D_i = \sum_{j=0}^{n-1} d_{ij}$$

wherein $D_i$ denotes the distance measure of the candidate under measure; n denotes the number of candidate motion vectors in the candidate motion vector set and $d_{ij}$ denotes a distance of the candidate under measure with an index i to a candidate motion vector with an index j in the candidate motion vector set, and $d_{ij}$ is calculated by following:

$$d_{ij}=|vi_x-vj_x|+|vj_y+vj_y|$$

wherein $vi_x$ and $vi_y$ respectively denote x and y components of the candidate under measure; and $vj_x$ and $vj_y$ respectively denote x and y components of the candidate motion vector with the index j.

6. The method of claim 4, wherein the distance measure of a candidate under measure in a candidate motion vector set is calculated by following:

$$D_i=|vi_x-MV_{Center\_x}|+|vi_y-MV_{Center\_y}|$$

wherein $D_i$ denotes the distance measure of the candidate under measure; $vi_x$ and $vi_y$ respectively denote x and y components of the candidate under measure; and $MV_{center\_x}$ and $MV_{Center\_y}$ respectively denote x and y components of a motion vector center.

7. The method of claim 6, wherein the x and y components of the motion vector center are respectively calculated by following:

$$MV_{Center\_x} = \frac{\arg\max_{0\leq j<n-1}\{vj_x\} + \arg\min_{0\leq j<n-1}\{vj_x\}}{2}$$

$$MV_{Center\_y} = \frac{\arg\max_{0\leq j<n-1}\{vj_y\} + \arg\min_{0\leq j<n-1}\{vj_y\}}{2}$$

wherein $vj_x$ and $vj_y$ respectively denote x and y components of a candidate motion vector in the candidate motion vector set with an index j, and n denotes the number of candidate motion vectors in the candidate motion vector set.

8. The method of claim 6, wherein the x and y components of the motion vector center are respectively calculated by following:

$$MV_{Center\_x} = \frac{1}{n}\sum_{j=0}^{n-1} vj_x$$

$$MV_{Center\_y} = \frac{1}{n}\sum_{j=0}^{n-1} vj_y$$

wherein $vj_x$ and $vj_y$ respectively denote x and y components of a candidate motion vector in the candidate motion vector set with an index j, and n denotes the number of candidate motion vectors in the candidate motion vector set.

9. The method of claim 1, wherein the received plurality of candidates with respect to the current prediction target are candidate motion vectors for predicting a motion vector of a current coding unit or predicting unit obtained under merge mode for High Efficiency Video Coding (HEVC).

10. The method of claim 1, wherein the received plurality of candidates with respect to the current prediction target are candidate positions for predicting a current macro-block or sub-block of the image obtained using a fast block-matching method.

11. An image encoding apparatus, comprising:

a system and external memory controller coupled to a system bus for accessing an external memory;

a distortion-based cost calculation circuit, coupled to the system and external memory controller;

a data access condition computing circuit, coupled to the system and external memory controller, wherein the system and external memory controller is configured to receive a plurality of candidates with respect to a current prediction target of an image, wherein the plurality of candidates are related to the current prediction target spatially or temporally;

control the distortion-based cost calculation circuit to calculate a distortion-based cost of a first candidate in the plurality of candidates; and for each of the other candidates in the plurality of candidates, control the data access condition computing circuit to compute a data access availability and a data access requirement for the system and external memory controller to control the distortion-based cost calculation circuit to calculate a distortion-based cost of a current candidate in the other candidates of the plurality of candidates; and if the data access requirement does not exceed the data access availability, control the distortion-based cost calculation circuit to calculate the distortion-based cost of the current candidate; otherwise, control the distortion-based cost calculation circuit to select the candidate with the minimum calculated distortion-based cost as a matched candidate for the current prediction target, wherein the data access condition computing module compute the data access availability and the data access requirement respectively by the following:

$$BW_{Available}=\lfloor CLK_{Available}<<\log_2 Bits_{BUS}\rfloor>>3$$

$$BW_{Required}=W_{curr}\cdot H_{curr}$$

wherein $BW_{Available}$ and $BW_{Required}$ are respectively the data access availability and data access requirement expressed in terms of bandwidth; $Bits_{Bus}$ denotes a bandwidth of the system bus; and $W_{curr}$ and $H_{curr}$ are respectively a width and height of a region in the image associated with the current prediction target.

12. The apparatus of claim 11, wherein the data access condition computing circuit derives the data access availability using available time in allotted time for encoding one unit region of the image and the available time is calculated by following:

$$CLK_{Available}=CLK_{Total}-CLK_{Used}$$

wherein $CLK_{Available}$ denotes the available time in clock cycles; $CLK_{Total}$ denotes the allotted time for encoding one unit region of the image in clock cycles; $CLK_{Used}$ denotes used time for operations comprising calculating a distortion-based cost for each candidate for each previous prediction target with respect to the current prediction target and for each previous candidate with respect to the current candidate for the current prediction target in clock cycles.

13. The apparatus of claim 11, wherein the current prediction target is a motion vector of the region of the image, and the plurality of candidates is a candidate motion vector set comprising a plurality of candidate motion vectors for predicting the current prediction target, and the apparatus further comprises:
a distance calculation module, configured to receive the candidate motion vector set and calculate a distance measure of each candidate motion vector in the candidate motion vector set statistically with respect to the other candidate motion vectors; and
a candidate prioritization module, coupled to the system and external memory controller, and configured to prioritize the candidate motion vector set according to the distance measure of each candidate motion vector in the candidate motion vector set.

14. The apparatus of claim 13, wherein the distance measure of a candidate under measure in a candidate motion vector set is calculated by following:

$$D_i = \sum_{j=0}^{n-1} d_{ij}$$

wherein $D_i$ denotes the distance measure of the candidate under measure; n denotes the number of candidate motion vectors in the candidate motion vector set and $d_{ij}$ denotes a distance of the candidate under measure with an index i to a candidate motion vector with an index j in the candidate motion vector set, and $d_{ij}$ is calculated by following:

$$d_{ij} = |vi_x - vj_x| + |vj_y - vj_y|$$

wherein $vi_x$ and $vi_y$ respectively denote x and y components of the candidate under measure; and $vj_x$ and $vj_y$ respectively denote x and y components of the candidate motion vector with the index j.

15. The apparatus of claim 13, wherein the distance measure of a candidate under measure in a candidate motion vector set is calculated by following:

$$D_i = |vi_x - MV_{Center\_x}| + |vi_y - MV_{Center\_y}|$$

wherein $D_i$ denotes the distance measure of the candidate under measure; $vi_x$ and $vi_y$ respectively denote x and y components of the candidate under measure; and $MV_{center\_x}$ and $MV_{Center\_y}$ respectively denote x and y components of a motion vector center.

16. The apparatus of claim 15, wherein the x and y components of the motion vector center are respectively calculated by following:

$$MV_{Center\_x} = \frac{\arg\max_{0 \le j < n-1} \{vj_x\} + \arg\min_{0 \le j < n-1} \{vj_x\}}{2}$$

$$MV_{Center\_y} = \frac{\arg\max_{0 \le j < n-1} \{vj_y\} + \arg\min_{0 \le j < n-1} \{vj_y\}}{2}$$

wherein $vj_x$ and $vj_y$ respectively denote x and y components of a candidate motion vector in the candidate motion vector set with an index j, and n denotes the number of candidate motion vectors in the candidate motion vector set.

17. The apparatus of claim 15, wherein the x and y components of the motion vector center are respectively calculated by following:

$$MV_{Center\_x} = \frac{1}{n}\sum_{j=0}^{n-1} vj_x$$

$$MV_{Center\_y} = \frac{1}{n}\sum_{j=0}^{n-1} vj_y$$

wherein $vj_x$ and $vj_y$ respectively denote x and y components of a candidate motion vector in the candidate motion vector set with an index j, and n denotes the number of candidate motion vectors in the candidate motion vector set.

18. The apparatus of claim 11, wherein the received plurality of candidates with respect to the current prediction target are candidate motion vectors for predicting a motion vector of a current coding unit or predicting unit obtained under merge mode for High Efficiency Video Coding (HEVC).

19. The apparatus of claim 11, wherein the received plurality of candidates with respect to the current prediction target are candidate positions for predicting a macro-block or sub-block obtained using a fast block-matching method.

* * * * *